United States Patent [19]

Clendinning et al.

[11] Patent Number: 5,001,200

[45] Date of Patent: Mar. 19, 1991

[54] POLY(PHENYLENE OXIDE)-POLY(ARYL ETHER KETONE) BLENDS

[75] Inventors: Robert A. Clendinning, New Providence; James E. Harris, Piscataway; Markus Matzner, Edison, all of N.J.; Lloyd M. Robeson, Macungie, Pa.

[73] Assignee: Amoco Corporation, Chicago, Ill.

[21] Appl. No.: 249,149

[22] Filed: Sep. 26, 1988

Related U.S. Applications Data

[63] Continuation of Ser. No. 039,309, Apr. 16, 1987, abandoned.

[51] Int. Cl.$^5$ .............................................. C08L 71/12
[52] U.S. Cl. ..................................... 525/390; 528/125
[58] Field of Search ................................ 525/390, 905

[56] References Cited

U.S. PATENT DOCUMENTS

| | | | |
|---|---|---|---|
| 3,306,874 | 2/1967 | Hay | 525/215 |
| 3,342,892 | 9/1967 | Laakso et al. | 525/212 |
| 4,388,444 | 6/1983 | Irvin | 525/92 |
| 4,398,020 | 8/1983 | Rose | 528/207 |
| 4,440,890 | 4/1984 | Robenson | 524/159 |
| 4,879,338 | 11/1989 | Mercer et al. | 525/390 |

*Primary Examiner*—Jacob Ziegler
*Attorney, Agent, or Firm*—Frederick S. Jerome; William H. Magidson; Ralph C. Medhurst

[57] ABSTRACT

Described herein are isomorphic blends of poly(phenylene oxide) and poly(aryl ether ketones) having less than about 30 mole percent and preferably less than about 25 mole percent of keto groups based on the total keto and ether groups. The blends are particularly desirable for use as an electrical insulation for electrical conductors.

13 Claims, No Drawings

POLY(PHENYLENE OXIDE)-POLY(ARYL ETHER KETONE) BLENDS

This is a continuation of application Ser. No. 039,309, filed Apr. 16, 1987.

FIELD OF THE INVENTION

This invention describes isomorphic blends of poly(phenylene oxide) and poly(aryl ether ketones) having less than about 30 mole percent and preferably less than about 25 mole percent of keto groups based on the total keto and ether groups. The novel blends are useful in the manufacture of extruded sheet, high temperature connectors, aircraft and mass transportation vehicle interiors, injection molded articles, and extruded profiles and thermoformable articles.

BACKGROUND OF THE INVENTION

Poly(aryl ether ketones) are a known class of engineering polymers. Several poly(aryl ether ketones) are highly crystalline with melting points above 300° C. Two of these crystalline poly(aryl ether ketones) are commercially available and are of the following structure:

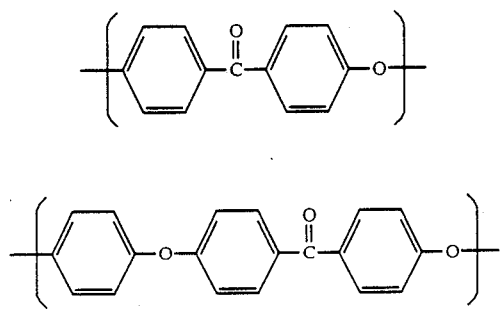

Over the years, there has been developed a substantial body of patent and other literature directed to formation and properties of poly(aryl ethers). Some of the earliest work, such as by Bonner, U.S. Pat. No. 3,065,205, involves the electrophilic aromatic substitution (e.g. FriedelCrafts catalyzed) reaction of aromatic diacylhalides with unsubstituted aromatic compounds such as diphenyl ether. The evolution of this class to a much broader range of PAE's was achieved by Johnson et al., Journal of Polymer Science, A-1, Vol. 5, 1967, pp. 2415-2427; Johnson et al., U.S. Pat. Nos. 4,107,837 and 4,175,175. Johnson et al. show that a very broad range of PAE can be formed by the nucleophilic aromatic substitution (condensation) reaction of an activated aromatic dihalide and an aromatic diol. By this method, Johnson et al. created a host of new PAE's including a broad class of poly(aryl ether ketones), hereinafter called "PAEK".

In recent years, there has developed a growing interest in PAEK's as evidenced by Dahl, U.S. Pat. No. 3,953,400; Dahl et al. U.S. Pat. No. 3,956,240; Dahl, U.S. Pat. No. 4,247,682; Rose et al., U.S. Pat. No. 4,320,224; Maresca, U.S. Pat. No. 4,339,568; Atwood et al., Polymer, 1981, Vol. 22, August, pp. 1096-1103; Blundell et al., Polymer, 1983, Vol. 24, August, pp. 953-958; Atwood et al., Polymer Preprints, 20, No. 1, April 1979, pp. 191-194; and Rueda et al., Polymer Communications, 1983, Vol. 24, September, pp. 258-260. In the early-to-mid 1970's, Raychem Corp. commercially introduced a PAEK called Stilan™, a polymer whose acronym is PEK, each ether and keto group being separated by 1,4-phenylene units. In 1978, Imperial Chemical Industries PLC (ICI), commercialized a PAEK under the trademark Victrex PEEK. As PAEK is the acronym of poly(aryl ether ketone), PEEK is the acronym of poly(ether ether ketone) in which the 1,4-phenylene units in the structure are assumed.

Thus, PAEK's are well known; they can be synthesized from a variety of starting materials, and they can be made with different melting temperatures and molecular weights. The PAEK's are crystalline, and, as shown by the Dahl and Dahl et al. patents, supra, at sufficiently high molecular weights they can be tough, i.e., they exhibit high values ($>50$ ft-lbs/in$^2$) in the tensile impact test (ASTM D-1822). They have potential for a wide variety of uses, but because of the significant cost to manufacture them, they are expensive polymers. Their favorable properties class them in the upper bracket of engineering polymers.

PAEK's may be produced by the Friedel-Crafts catalyzed reaction of aromatic diacylhalides with unsubstituted aromatic compounds such as diphenyl ether as described in, for example, U.S. Pat. No. 3,065,205. These processes are generally inexpensive processes; however, the polymers produced by these processes have been stated by Dahl et al., supra, to be brittle and thermally unstable. The Dahl patents, supra, allegedly depict more expensive processes for making superior PAEK's by Friedel-Crafts catalysis. In contrast, PAEK's such as PEEK made by nucleophilic aromatic substitution reactions are produced from expensive starting fluoro monomers, and thus would be classed as expensive polymers.

These poly(aryl ether ketones) exhibit an excellent combination of properties, i.e., thermal and hydrolytic stability, high strength and toughness, wear and abrasion resistance and solvent resistance. Thus, articles molded from poly(aryl ether ketones) have utility where high performance is required.

The melting point requirements of these materials vary with their particular applications. A characteristic facet of PAEK technology is that the crystalline melting point can be fairly accurately determined from the ether-to-ketone ratio in the polymer. As the ratio goes up, the melting point ($T_m$) goes down. The change of the ether-to-keto ratio can be achieved by increasing the ether-containing and/or forming component in the polymer manufacture at the expense of the keto-containing component and vice versa. The tools for doing this are well within the capabilities of the skilled chemist, knowledgeable of the techniques of electrophilic and nucleophilic aromatic substitution reactions. Moreover, the displacement of these groups along the linear chain of the polymer is not narrowly critical to achieving the $T_m$ and $T_g$ properties. The practical problem encountered with this approach, however, is that for each poly(aryl ether ketone) with a given melting point, a separate preparative scheme utilizing well-defined raw materials is required. This is obviously highly impractical.

A much simpler and a much more desirable approach consists in the ability to blend two polymers to obtain a tough poly(aryl ether ketone) with one $T_g$ and one melting point as required for the particular application.

Polymer miscibility is virtually impossible to predict a priori; a very small variation in structure may lead to a totally different solubility behavior. Hence, the solubility properties discovered by the inventors are unexpected and unique. A brief discussion of polymer miscibility, which will illustrate the above, follows.

In the field of miscibility or compatibility of polymer blends, the art has found predictability to be unattainable, even though considerable work on the matter has been done. According to authorities:

(A) "It is well known that compatible polymer blends are rare." Wang and Cooper, Journal of Polymer Science, Polymer Physics Edition, Vol. 21, p. 11 (1983).

(B) "Miscibility in polymer-polymer blends is a subject of widespread theoretical as well as practical interest currently. In the past decade or so, the number of blend systems that are known to be miscible has increased considerably. Moreover, a number of systems have been found that exhibit upper and lower critical solution temperatures, i.e., complete miscibility only in limited temperature ranges. Modern thermodynamic theories have had limited success to date in predicting miscibility behavior in detail. These limitations have spawned a degree of pessimism regarding the likelihood that any practical theory can be developed that can accommodate the real complexities that nature has bestowed on polymer-polymer interactions." Kambour, Bendler, Bopp, Macromolecules, 1983, 16, 753.

(C) "The vast majority of polymer pairs form two-phase blends after mixing as can be surmised from the small entropy of mixing for very large molecules. These blends are generally characterized by opacity, distinct thermal transitions, and poor mechanical properties. However, special precautions in the preparation of two-phase blends can yield composites with superior mechanical properties. These materials play a major role in the polymer industry, in several instances commanding a larger market than either of the pure components." Olabisi, Robeson, and Shaw; Polymer-Polymer Miscibility, 1979, published by Academic Press, New York, N.Y., p. 7.

(D) "It is well known that, regarding the mixing of thermoplastic polymers, incompatibility is the rule and miscibility or even partial miscibility is the exception. Since most thermoplastic polymers are immiscible with other thermoplastic polymers, the discovery of a homogeneous mixture or partially miscible mixture of two or more thermoplastic polymers is, indeed, inherently unpredictable with any degree of certainty." P. J. Flory, Principles of Polymer Chemistry, Cornell University Press, 1953, Chapter 13, p. 555. Younes, U.S. Pat. No. 4,371,672.

(E) "The study of polymer blends has assumed an ever increasing importance in recent years and the resulting research effort has led to the discovery of a number of miscible polymer combinations. Complete miscibility is an unusual property in binary polymer mixtures which normally tend to form phase-separated systems. Much of the work has been of a qualitative nature, however, and variables such as molecular weight and conditions of blend preparation have often been overlooked. The criteria for establishing miscibility are also varied and may not always all be applicable to particular systems." Saeki, Cowie and McEwen, Polymer, 1983, Vol. 25, January, p. 60.

Thus, miscible polymer blends are not common. The criteria for determining whether or not two polymers are miscible are now well established. According to Olabisi et al., Polymer-Polymer Miscibility, 1979, published by Academic Press, New York, N.Y., p. 120:

"The most commonly used method for establishing miscibility in polymer-polymer blends or partial phase mixing in such blends is through determination of the glass transition (or transitions) in the blend versus those of the unblended constituents. A miscible polymer blend will exhibit a single glass transition between the Tg's of the components with a sharpness of the transition similar to that of the components. In cases of borderline miscibility, broadening of the transition will occur. With cases of limited miscibility, two separate transitions between those of the constituents may result, depicting a component 1-rich phase and a component 2-rich phase. In cases where strong specific interactions occur, the Tg may go through a maximum as a function of concentration. The basic limitation of the utility of glass transition determinations in ascertaining polymer-polymer miscibility exists with blends composed of components which have equal or similar (<20° C. difference) Tg's, whereby resolution by the techniques to be discussed of two Tg's is not possible."

W. J. MacKnight et al., in *Polymer Blends*; D. R. Paul and S. Newman, eds., 1978, published by Academic Press, New York, N.Y., state on page 188:

"Perhaps the most unambiguous criterion of polymer compatibility is the detection of a single glass transition whose temperature is intermediate between those corresponding to the two component polymers."

In this passage, it is clear from the omitted text, that by compatibility the authors mean miscibility, i.e., single..phase behavior. See, for example, the discussion in Chapter 1 by D. R. Paul in the same work.

As a specific example of how difficult it is to predict the miscibility of polymers, a priori let us take an example from U.S. Pat. No. 4,258,155. Example 8 shows that the polyamideimide

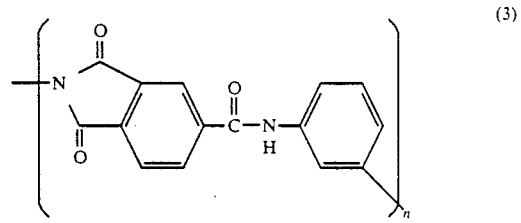

and the polyetherimide

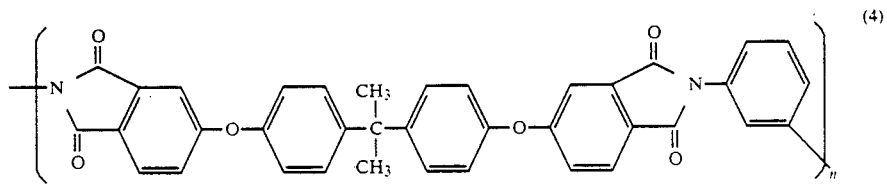

(4)

are miscible as evidenced by the single Tg of the blends. However, as described in European Patent Application 016,354, the closely related polyamide-imide copolymer (5)

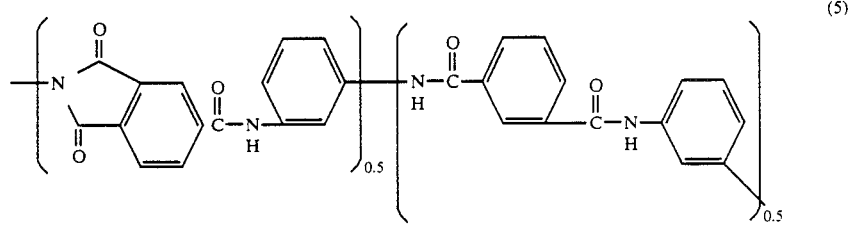

(5)

is not miscible with the polyetherimide (4) above even though it contains 50 mole percent of repeat units (3).

THE INVENTION

It has now been unexpectedly found that blends of poly(phenylene oxide) (6)

(6)

with poly(aryl ether ketones) containing less than about 30 mole percent of ketone groups, and preferably less than about 25 mole percent of ketone groups based on the total keto and ether groups, display one Tg and one Tm. Moreover, these blends are isomorphic and have melting points that are intermediate between the melting point of (6) ($T_m$ approximately 280° C.) and that of the PAEK ($T_m$ being about 330° C. at the highest allowable keto content. The alloys of the instant invention are tough and possess excellent chemical and thermal stability.

The poly(phenylene oxide) (6) is a known material. It can be prepared at high molecular weight via the Ullmann reaction shown in Equation I and described by van Dort et al., in the

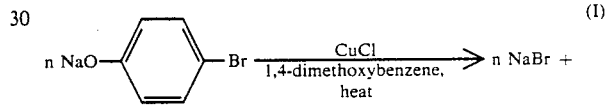

(I)

(7)          (8)

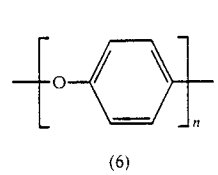

(6)

European Polymer Journal, 1968, Vol. 4, pp. 275-287; the subject polymerization was also described in French Patent No. 1,301,174 and in U.S. Pat. No. 3,228,910.

The crystalline poly(aryl ether ketones) which are suitable for use herein can be generically characterized as containing repeating units of one or more of the following formulae:

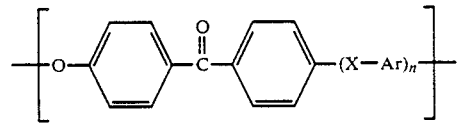

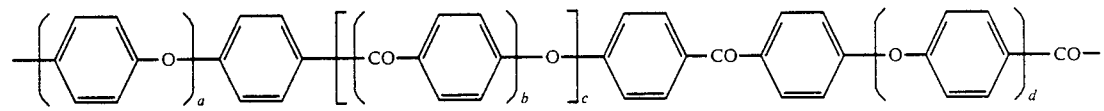

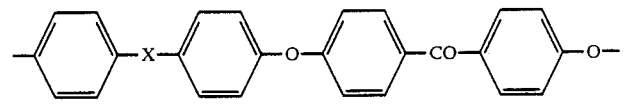

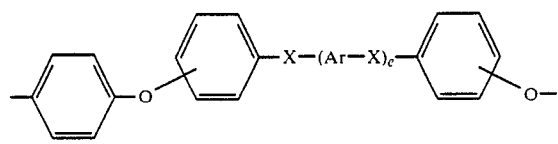

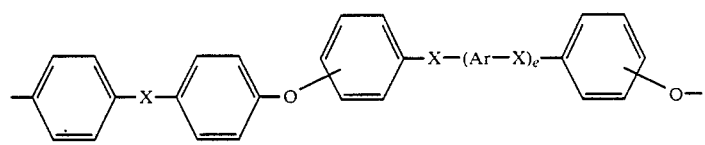

wherein Ar is independently a divalent aromatic radical selected from phenylene, biphenylene or naphthylene: X is independently O, C, or a direct bond, n is an integer from 0 to 3; b, c, d, and e are 0 to 1; a is an integer of 1 to 4; and preferably d is 0 when b is 1.

Preferred poly(aryl ether ketones) include those having repeating units of the formulae:

In addition, the poly(aryl ether ketones) may contain small amounts of the units listed below, provided that the total mole percentage of the keto groups based on the total of keto and ether groups be equal or below about 30% percent and preferably equal or below about 25%.

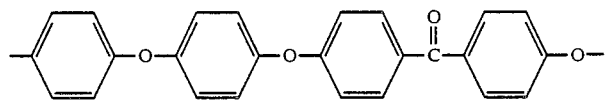

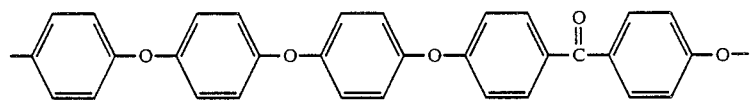

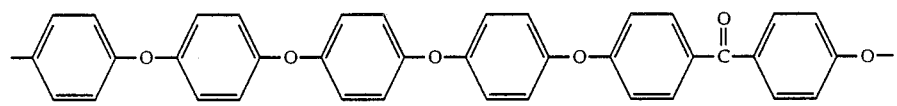

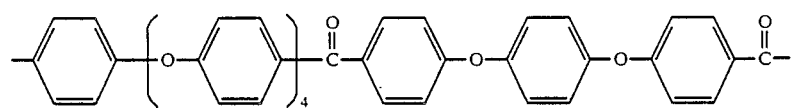

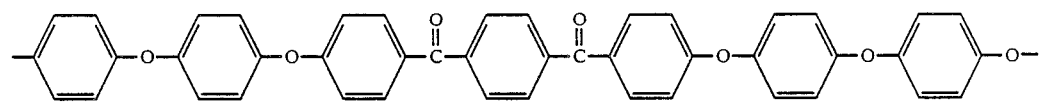

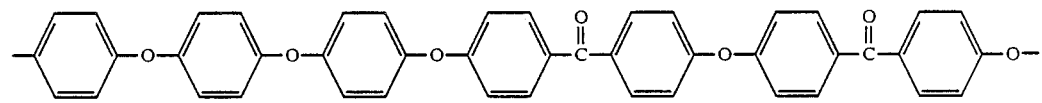

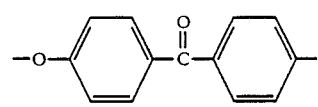

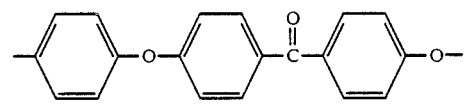

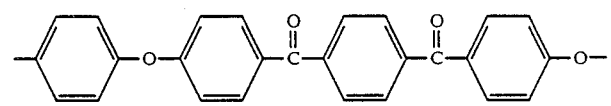

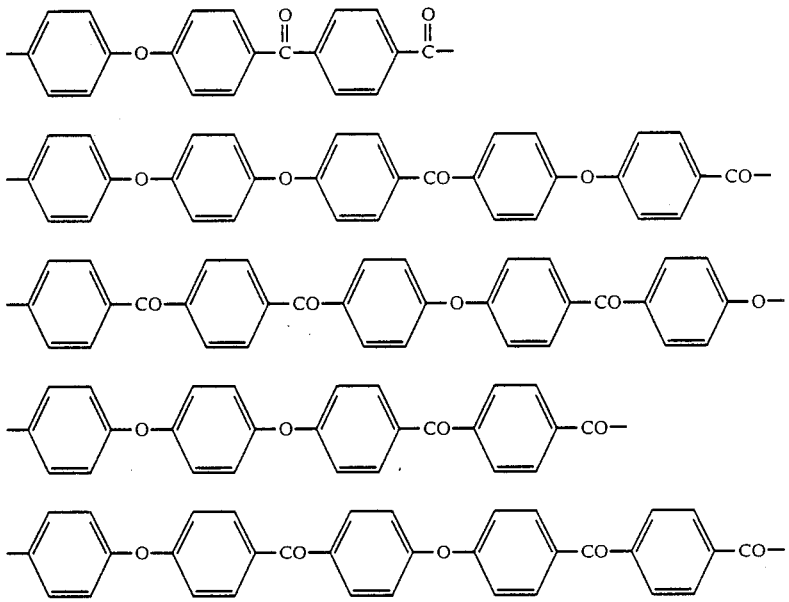

These poly(aryl ether ketones) are prepared by methods well known in the art. One such method comprises heating a substantially equimolar mixture of at least one bisphenol and at least one dihalobenzoid compound and/or at least one halophenol compound. Preferred bisphenols in such a process include: hydroquinone, 4,4'-dihydroxybenzophenone, 4,4'-dihydroxydiphenyl ether, 1,4-bis(4'-hydroxyphenoxy)benzene, and 4,4'-bis(4'-hydroxyphenoxy)diphenyl ether.

Preferred halophenol and dihalobenzoid compounds include:
4-(4'-chlorobenzoyl)phenol,
4-(4'-fluorobenzoyl)phenol,
4,4'-difluorobenzophenone,
4,4'-dichlorobenzophenone,
4-chloro-4'-fluorobenzophenone,

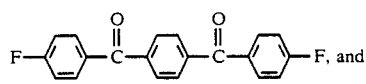

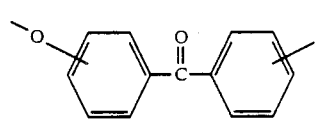

The poly(aryl ether ketones) may be produced by the process as described in, for example, U.S. Pat. No. 4,176,222. This process comprises heating in the temperature range of 100° C. to 400' C., (1) a substantially equimolar mixture of
 (a) at least one bisphenol, and
 (b) at least one dihalobenzenoid compound, and/or
(2) at least one halophenol, in which in the dihalobenzenoid compound or halophenol, the halogen atoms are activated by —CO— groups ortho or para thereto, with a mixture of sodium carbonate or bicarbonate and a second alkali metal carbonate or bicarbonate, the alkali metal of said second alkali metal carbonate or bicarbonate having a higher atomic number than that of sodium, the amount of said second alkali metal carbonate or bicarbonate being such that there are 0.001 to 0.2 grams atoms of said alkali metal of higher atomic number per gram atom of sodium, the total amount of alkali metal carbonate or bicarbonate being such that there is at least one alkali metal atom for each phenol group present, and thereafter separating the polymer from the alkali metal halide.

Also, poly(aryl ether ketones) such as those containing repeating units of the formula:

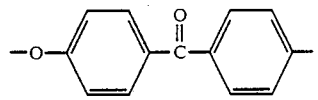

may be produced by Friedel-Craft reactions utilizing hydrogen fluoride-boron trifluoride catalysts as described, for example, U.S. Pat. No. 3,953,400.

Additionally, poly(aryl ether ketones) of the following formula:

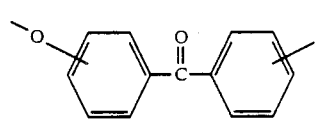

may be prepared by Friedel-Craft reactions using boron fluoridehydrogen fluoride catalyst as described in, for example, U.S. Pat. Nos. 3,441,538; 3,442,857 and 3,516,966.

The polyketones may also be prepared according to the process as described in, for example, U.S. Defensive Publication T-103,703 and U.S. Pat. No. 4,396,755. In such processes, reactants such as (a) an aromatic monocarboxylic acid; (b) a mixture of at least one aromatic dicarboxylic acid and an aromatic hydrocarbon; and (c) combinations of (a) and (b) are reacted in the presence of a fluoroalkane sulphonic acid, particularly trifluoromethane sulphonic acid.

Additionally, the poly(aryl ether ketones) may be prepared according to the process as described in, for example, U.S. Pat. No. 4,398,020. In such a process, (1) a mixture of substantially equimolar amounts of
 (a) at least one aromatic diacyl halide of the formula:

YOC—Ar—COY where —Ar— is a divalent aromatic radical, Y is halogen and COY is an aromatically bound acyl halide group, which diacyl halide is polymerizable with at least one aromatic compound of (1)(b), and (b) at least one aromatic compound of the formula:

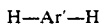
H—Ar'—H wherein —Ar"— is a divalent aromatic radical and H is an aromatically bound hydrogen atom, which compound is polymerizable with at least one diacyl halide of (1)(a), or (2) at least one aromatic monacyl halide of the formula:

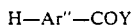
H—Ar"—COY where —Ar"— is a divalent aromatic radical, H is an aromatically bound hydrogen atom, and Y and COY are as defined above, which monoacyl halide is self-polymerizable, or (3) a combination of (1) and (2) are reacted in the presence of a fluoroalkane sulphonic acid.

The term poly(aryl ether ketone) as used herein, is meant to include homopolymers, copolymers, terpolymers, graft copolymers, and the like.

The poly(aryl ether ketones) have a reduced viscosity of at least about 0.4 to about 5.0 dl/g, as measured in concentrated sulphuric acid at 25° C.

The poly(phenylene oxide) (6) useful for the purposes of the instant invention, has a reduced viscosity of at least 0.4 dl/g as measured in nitrobenzene, at 140° C.

The poly(aryl ether ketone) and the poly(phenylene oxide) (6) are each used in the blend in amounts of from about 2 to 98, preferably from about 20 to about 80 weight percent.

The blends of this invention may include mineral fillers such as carbonates including, chalk, calcite and dolomite; silicates including mica, talc, wollastonite, silicon dioxide; glass spheres; glass powders; aluminum; clay; quartz; and the like. Also, reinforcing fibers such as fiberglass, carbon fibers, and the like may be used. The blend may also include additives such as titanium dioxide; thermal stabilizers, ultraviolet light stabilizers, plasticizers, and the like.

The blends of this invention may be fabricated into any desired shape, i.e., moldings, coatings, films, or fibers. They are particularly desirable for use as an electrical insulation for electrical conductors.

EXAMPLES

The following examples serve to give specific illustrations of the practice of this invention but they are not intended in any way to limit the scope of this invention.

The designations used in the examples have the following meanings:

PPO-Poly(phenylene oxide) (6) prepared according to van Dort et al., European Polymer Journal. 1968, Vol. 4, pp. 275-287; RV(nitrobenzene, 140° C.)>1.0 dl/g.

Poly(aryl ether ketone) I (PAEK I) having the formula:

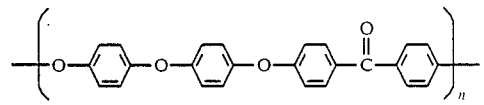

Poly(aryl) ether ketone) II (PAEK II) having the formula:

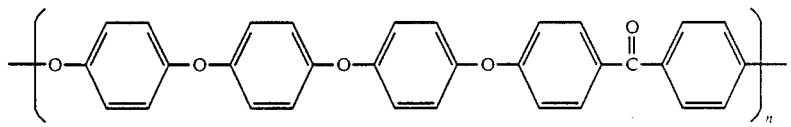

Poly(aryl ether ketone) III (PEAE III) having the formula:

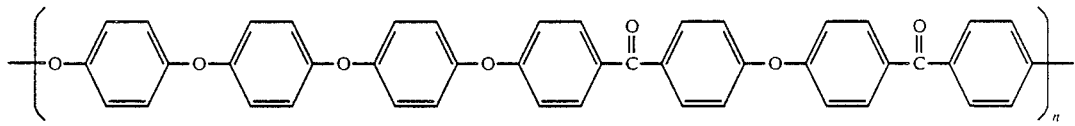

All of the PAEK's have RV's>1.0 dl/g as measured in concentrated sulfuric acid at 25° C. The PPO and the PAEK's are alloyed in the melt. The obtained products are listed in the TAble. All have very good mechanical properties.

TABLE

| Alloy From | | |
|---|---|---|
| PPO (wt %) | PAEK (wt %) | Melting Point ($T_m$), °C. |
| 50 | PAEK I (50) | 320* |
| 50 | PAEK II (50) | 305* |
| 50 | PAEK III (50) | 325* |
| 75 | PAEK I (25) | 300* |
| 25 | PAEK III (75) | — |
| 0 | PAEK I (100) | 324** |
| 0 | PAEK II (100) | 310** |
| 0 | PAEK III (100) | 330** |
| 100 | — | 280** |

*Estimated using the observations described in J.Polymer. Sci.. Part B: Polymer Physics. Vol. 25. pp. 311-323 (1987).
**Determined by DSC, rate of heating 10° C./minute.

What is claimed is:

1. An isomorphic blend comprising a poly(phenylene oxide), consisting essentially of repeat units of the formula (I)

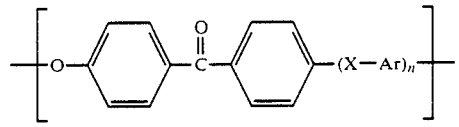

wherein n is an integer such that the reduced viscosity of (I) is at least 0.4 dL/g when measured in nitrobenzene at 140° C., and a poly(aryl ether ketone), provided that in the poly(aryl ether ketone) the mole percentage of keto groups based on the total of ketone and ether groups be equal to or below about 30 percent, the blend having one $T_g$ and one melting point, $T_m$.

2. A blend according to claim 1 wherein the poly(aryl ether ketone) contains repeating units of one or more of the following formulae:

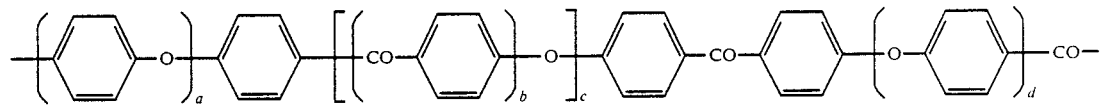

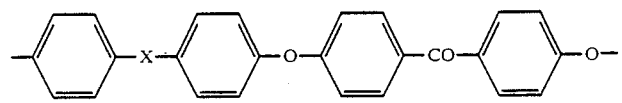

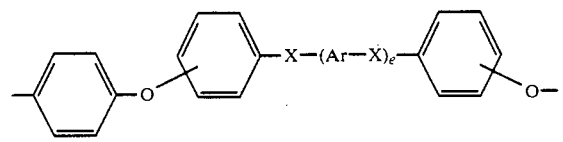

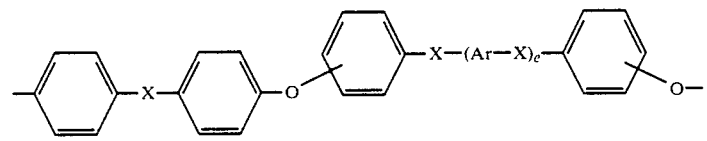

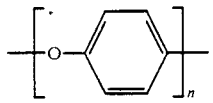

wherein Ar is independently a divalent aromatic radical selected from phenylene, biphenylene or naphthylene, X is independently O

or a direct bond, n is an integer of from 0 to 3; b, c, d, and e are 0 to 1; and a is an integer of 1 to 4.

3. A blend according to claim 1 wherein the poly(aryl ether ketone) includes repeating units of the formulae:

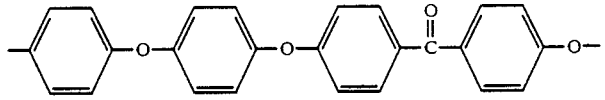

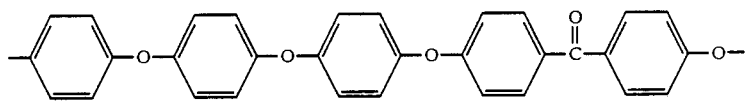

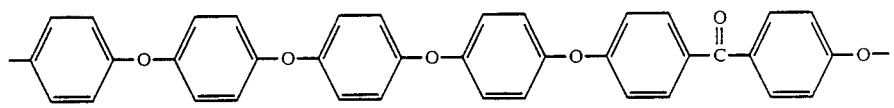

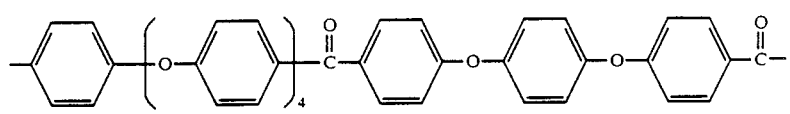

-continued

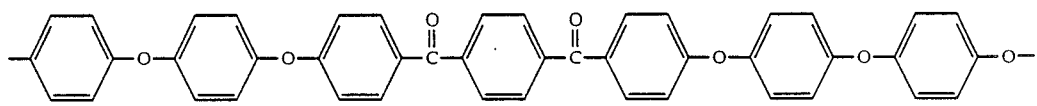

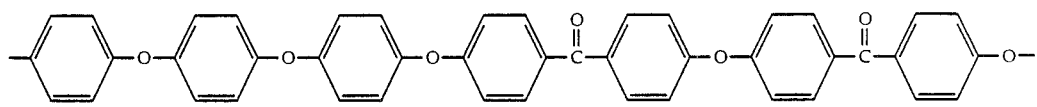

4. The blend according to claim 3 wherein the poly(aryl ether ketone) contains small amounts of units of the formulae:

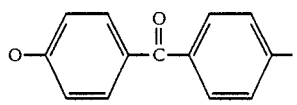

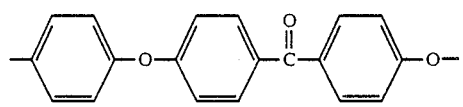

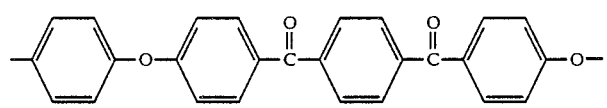

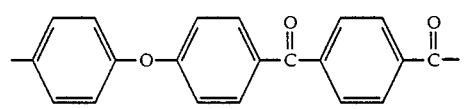

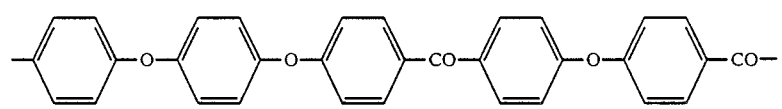

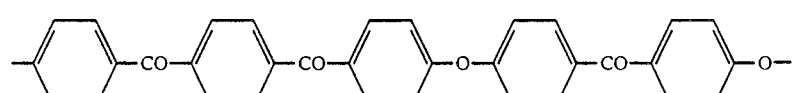

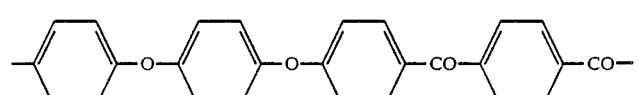

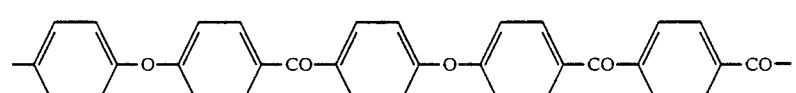

with the proviso that the mole percentage of keto groups cannot exceed 30 percent based on the total keto and ether groups.

5. The blend according to claim 1 wherein the poly(phenylene oxide) and the poly(aryl ether ketone) are each present in amounts of from 2 to 98 weight percent.

6. The blend according to claim 1 wherein the poly(phenylene oxide) has a reduced viscosity of at least 0.4 dl/g as measured in concentrated sulfuric acid at 25° C.

7. The blend according to claim 1 which contains 50 percent by weight of the poly(aryl ether ketone) having the formula:

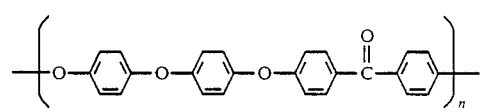

8. The blend according to claim 1 which contains 50 percent by weight of the poly(aryl ether ketone) having the formula:

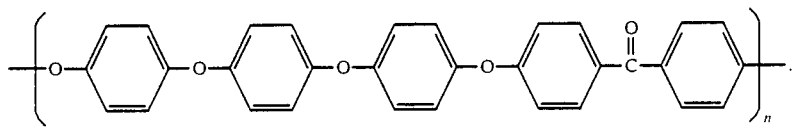

9. The blend according to claim 1 which contains 50 percent by weight of the poly(aryl ether ketone) having the formula:

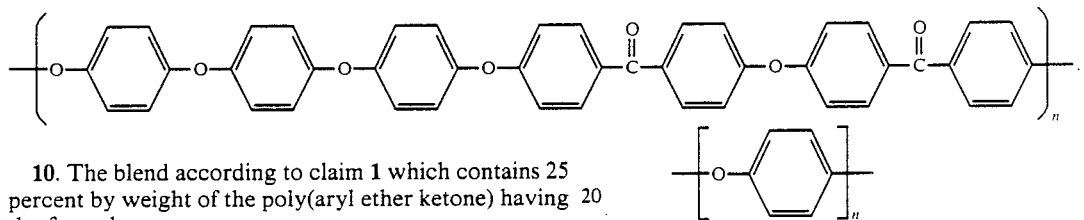

10. The blend according to claim 1 which contains 25 percent by weight of the poly(aryl ether ketone) having the formula:

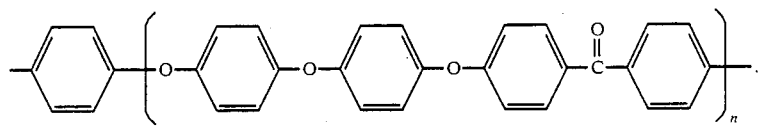

11. The blend according to claim 1 which contains 75 percent by weight of the poly(aryl ether ketone) having the formula:

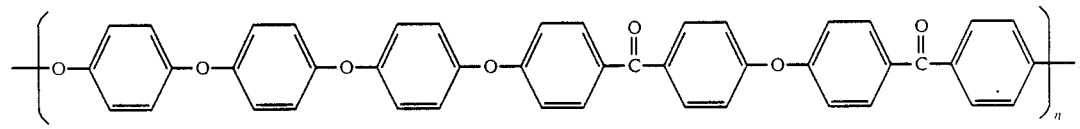

12. An isomorphic blend comprising a poly(phenylene oxide), consisting essentially of repeat units of the formula:

(I)

wherein n is an integer such that the reduced viscosity of (I) is at least 0.4 dL/g when measured in nitrobenzene at 140° C., and a poly(aryl ether ketone), wherein said poly(aryl ether ketone) contains less than about 25 mole percent of keto groups based on the total ether and keto groups, the blend having one $T_g$ and one melting point, $T_m$, in a range from about 280° C. to about 330° C.

13. A blend according to claim 12, wherein the poly(aryl ether ketone) comprises repeating units of one or more of the following formulae:

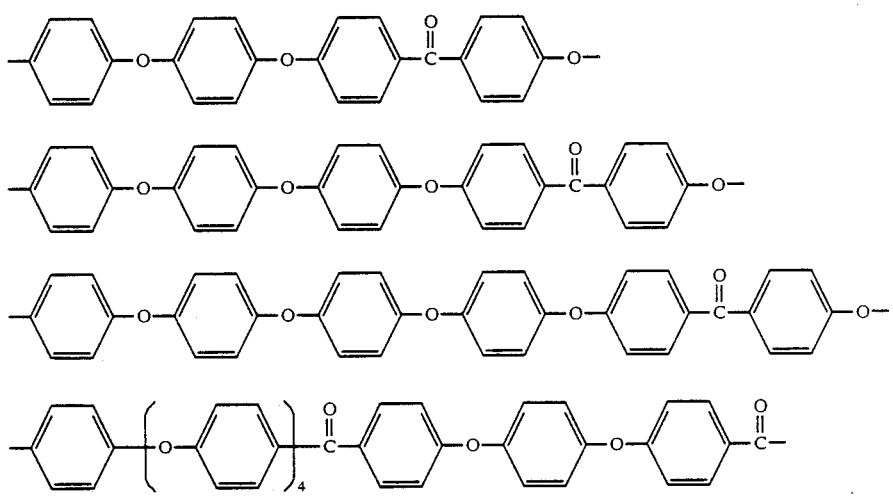

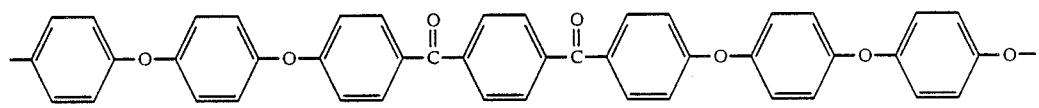
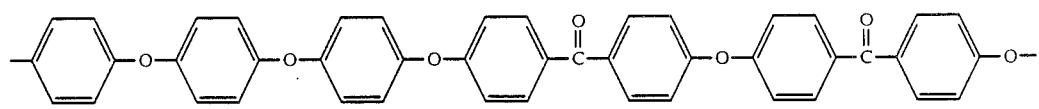
\* \* \* \* \*